July 4, 1933.　　　F. S. McCULLOUGH　　　1,917,047
GLASS TO METAL CONNECTION
Filed April 8, 1929
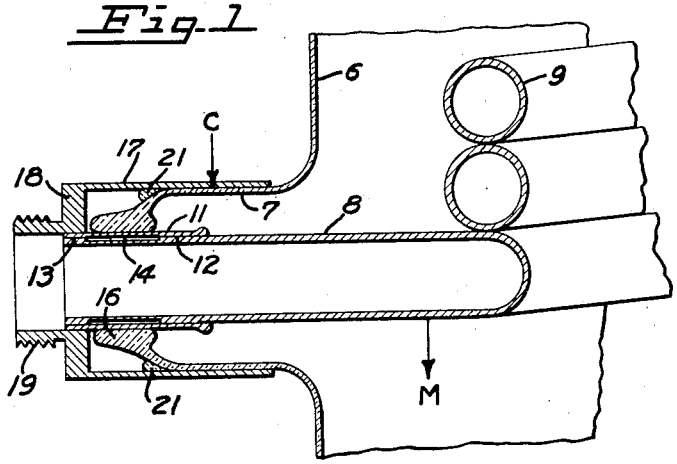
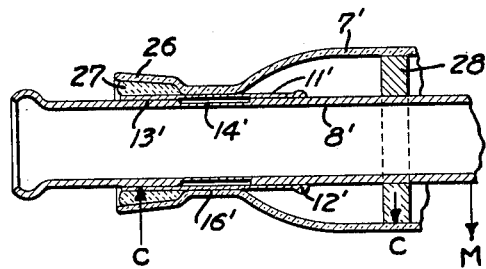
INVENTOR
FREDERICK S. McCULLOUGH
BY Charles S. Evans
HIS ATTORNEY.

Patented July 4, 1933

1,917,047

UNITED STATES PATENT OFFICE

FREDERICK S. McCULLOUGH, OF EDGEWOOD, PENNSYLVANIA, ASSIGNOR TO THE UNION NATIONAL BANK OF PITTSBURGH, OF PITTSBURGH, PENNSYLVANIA

GLASS TO METAL CONNECTION

Application filed April 8, 1929. Serial No. 353,397.

My invention relates to connections between dissimilar materials, and particularly to seals between metal and glass where the joint must withstand not only stresses caused by differential thermal expansion between the materials, but also a considerable load due to the weight of parts supported by it.

The broad purpose of my invention is to provide a connection which will support relatively large composite loads of this character. While sealing leads or other pieces of metal thru the wall of a glass envelope or within a glass tube is always a problem, it is much complicated where the lead is relatively large in diameter, since in this case large compressive stresses between glass and metal are added to the shearing stresses which are always present. A structure which may be quite adequate in the one case may fail in the other. An object of my invention is to provide a connection which is not limited as to the size of the parts.

Viewing the general problem in more specific terms, a serious difficulty has arisen in the past in connecting the supply of water or other cooling fluid to the terminals of audions or other vacuum tubes. The stresses due to misalinement of water connections, to the weight of the tubes or electrodes, and to the large temperature differences between the various parts of the apparatus are especially severe in this case. Another object of my invention is to provide a connection particularly adapted to this use.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

Referring to the drawing:—

Figure 1 is an axial sectional view of the connection of my invention as embodied in the terminal for the water cooled anode of a vacuum tube.

Figure 2 is an axial sectional view showing a modified form of my connection.

Broadly considered, my invention is a connection for members of dissimilar materials comprising a deformable portion secured to both members, and a buttress supported by one of the members and positioned to bear against the other member when the connection is stressed.

The principle involved is that the deformable portion of the connection absorbs the strains caused by differential expansion of the materials, but is sufficiently strong to transmit all normal shearing stresses caused by loading. Bending moments tending to stress the deformable portion beyond the elastic limit, and so permanently distort or destroy the connection, are borne by the buttress. The latter is substantially continuous between the members for the transmission of compressive stresses but is interrupted along a plane of shear, and therefore does not transmit thermal shearing stresses.

One of the embodiments of my invention comprises a glass or other vitreous envelope 6, which is provided with an extension or nipple 7. Thru this nipple passes a metal tube 8, forming the terminal lead of a water cooled anode 9.

The tube is provided with a thin deformable metal sleeve 11, welded to the tube at the abutment 12 but preferably free at the abutment 13. The sleeve bridges an annular groove 14 formed adjacent the end of the tube 8, and the nipple is drawn down to form a seal 16 with the portion of the sleeve above the groove, as is described in my copending application, Serial Number 269,439, filed April 12, 1928.

Fixed securely to the projecting end of the metal sleeve 11 is a cap comprising a rigid sleeve 17 having an inwardly extending flange 18 thru which the tube 8 is fitted. The flange may be secured to the sleeve 11 by soldering, or it may be threaded and screwed in place. It preferably carries a threaded extension 19 for coupling to a supply of water or other cooling fluid.

The internal diameter of the sleeve is such that it fits easily over the nipple. The weight of the parts applies a bending moment on the connection, as is shown by the arrow M, which tends to distort the sleeve 11. The sleeve 17, however, is rigid with the tube 8, and a slight deformation brings the sleeve 17 into contact with the nipple, where it acts as a buttress, transmitting the moment M to the nipple as a radial compressive stress, indicated by the arrow C in the figure. The connection thus has the load bearing power of a rigid joint of large area, but does not set up the temperature stresses in the glass which would be caused by such an arrangement.

In order that the bearing power of the buttress thus interposed between the lead and the glass may be exerted against very small stresses, a filler 21 such as plaster of paris may be used within the sleeve. The adhesion of this material to the glass is so slight that it does not transmit shearing stresses to the glass, but leaves buttress and glass unattached to each other. Cements which will transmit shear should not be used as fillers.

In the modification of my invention shown in Figure 2, I employ two buttresses, but the basic principle is the same. The reference characters referring to parts in this figure are distinguished by prime marks from the corresponding parts in Figure 1. The nipple 7' is flared to form a bell 26 beyond the seal 16, and a filler 27 of enamel or other suitable material occupies the space between the bell and the sleeve. This is the first buttress. The second is the collar 28 which surrounds and is fixed to the tube 8' and fits quite closely within the nipple. This type of connection will carry greater loads than the first, but has not the advantage of shielding the nipple from blows, and is not as convenient for attaching the water supply. The choice between these or other modifications depends upon the specific application of the invention.

It will be evident that it is not essential that the deformable element of the connection be a separate sleeve, as the principle would be the same were the seal made directly with a deformable portion of the metal member itself. It is also to be noted that the actual distortion of the deformable element under stress is usually very minute.

I claim:

1. In a device of the class described comprising a glass body and a metal pipe passing through the body and forming a continuation of a tubular electrode, said body having an extension thereon through which the pipe passes, a flexible sleeve on the pipe fused to the extension exteriorly of the confines of the glass body, and a rigid member surrounding the pipe tightly secured to the pipe outside the body and contacting with said extension of the body for transmitting moments of stress from the pipe to the body.

2. In a device of the class described comprising a metal member and a vitreous member having a wall through which the metal member is directly passed, a flexible sleeve having spaced apart ends encircling the metal member, one end of said sleeve being sealed to said metal member and the other end in contact therewith, the intermediate portion of said sleeve being spaced from said metal member and having the vitreous wall sealed to said intermediate portion, and a buttress rigidly carried on the metal member and bearing against said wall at a point away from the seal for transmitting moments of stress to a portion of the wall away from the seal, the vitreous wall comprising a nipple-like portion contracted about the flexible sleeve adjacent its free end.

3. In a device of the class described comprising a metal member and a vitreous body, a nipple portion on the vitreous body, the metal member passing directly through the nipple, a flexible sleeve around the metal member sealed thereto at one end and contacting therewith at the other end, the intermediate portion of the sleeve being spaced from the metal member, the nipple being contracted onto the flexible sleeve intermediate the ends of the sleeve, and a thimble rigidly mounted on the metal member outside the vitreous body enclosing a portion of the nipple.

4. In a device of the class described, a vitreous vessel having a tubulation thereon, a metal tube projecting through the tubulation from the exterior to the interior of the vessel, a flexible metal sleeve contacting at its opposite ends with the metal tube and spaced from the metal tube intermediate its ends, the tubulation of the vessel being contracted adjacent its free outer terminal about the sleeve and being fused to the sleeve between the ends of said sleeve, such sleeve and contracted extension forming a seal around the metal tube, and rigid means on the tube bearing against the tubulation of the vessel at a spaced point from the seal.

In testimony whereof, I have hereunto set my hand.

FREDERICK S. McCULLOUGH.